(12) United States Patent
Braun et al.

(10) Patent No.: US 6,823,667 B2
(45) Date of Patent: Nov. 30, 2004

(54) METHOD AND DEVICE FOR TREATING DIESEL EXHAUST GAS

(75) Inventors: Tillmann Braun, Berglen (DE); Oliver Ebelsheiser, Stuttgart (DE); Bernd Krutzsch, Denkendorf (DE); Klaus-Juergen Marquardt, Remshalden (DE); Michel Weibel, Stuttgart (DE); Guenter Wenninger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/361,008

(22) Filed: Feb. 10, 2003

(65) Prior Publication Data

US 2003/0170577 A1 Sep. 11, 2003

(30) Foreign Application Priority Data

Feb. 9, 2002 (DE) .......................................... 102 05 380

(51) Int. Cl.[7] .................................................. F01N 3/02
(52) U.S. Cl. ............................. 60/311; 60/274; 60/295; 60/297
(58) Field of Search ........................ 60/274, 295, 299, 60/311

(56) References Cited

U.S. PATENT DOCUMENTS

| | | | | |
|---|---|---|---|---|
| 5,501,714 A | * | 3/1996 | Valentine et al. .............. 44/358 |
| 5,522,905 A | | 6/1996 | Krutzsch et al. | |
| 5,758,496 A | * | 6/1998 | Rao et al. ...................... 60/295 |
| 6,051,040 A | * | 4/2000 | Peter-Hoblyn ................ 44/358 |
| 6,151,547 A | * | 11/2000 | Kumar et al. ................. 701/101 |
| 6,200,358 B1 | * | 3/2001 | Fleischer et al. .............. 44/300 |
| 6,361,579 B1 | * | 3/2002 | Itoh et al. ...................... 55/523 |
| 6,397,584 B2 | * | 6/2002 | Salvat et al. ................... 60/280 |
| 6,405,528 B1 | * | 6/2002 | Christen et al. ............... 60/295 |

FOREIGN PATENT DOCUMENTS

| | | |
|---|---|---|
| EP | 0341832 B1 | 1/1996 |
| JP | 61-135917 | * 6/1986 |

* cited by examiner

*Primary Examiner*—Thomas Denion
*Assistant Examiner*—Diem Tran
(74) *Attorney, Agent, or Firm*—Crowell & Moring LLP

(57) ABSTRACT

In a method for burning deposited soot particles in a particle filter on an exhaust device of a diesel engine, first of all, in a known way, a catalytic converter produces $NO_2$ from exhaust gas. This $NO_2$ reduces the ignition temperature of soot to such an extent that it burns at normal exhaust-gas temperature. Furthermore, there is provision to add fuel additive, which likewise allows the ignition temperature of the soot to be reduced. The sulphur content in the fuel is determined, and either generation of $NO_2$ or the addition of additive is used as a function of this measurement. This preferably takes place automatically. To determine the sulphur content, it is possible, for example, to use a sulphur sensor in the tank.

24 Claims, 1 Drawing Sheet

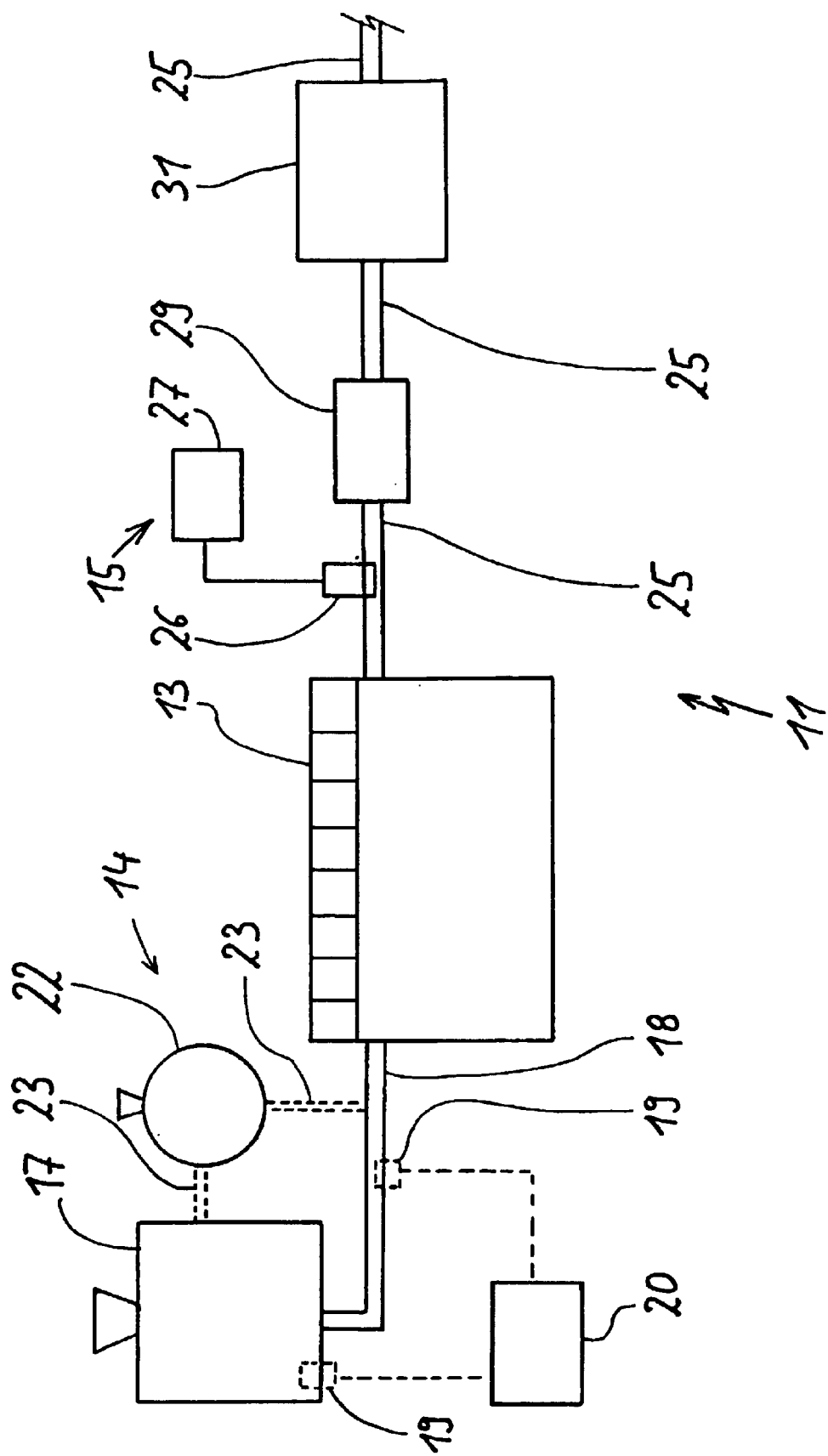

METHOD AND DEVICE FOR TREATING DIESEL EXHAUST GAS

This application claims the priority of German application 102 05 380.4, filed Feb. 9, 2002, the disclosure of which is expressly incorporated by reference herein.

BACKGROUND AND SUMMARY OF THE INVENTION

The present invention relates to a method and a device for removing particles, which have been deposited on a filter arranged in an exhaust system of a diesel internal combustion engine, by combustion.

To reduce the level of harmful exhaust gases from diesel internal combustion engines, and in particular to reduce the levels of soot particles, filters, in particular soot filters, are used in the exhaust system. These filters have the problem that they rapidly become blocked by the large quantities of soot which is produced and thereby become ineffective. For this reason, it is desirable for the soot on such filters to be eliminated by oxidation or combustion.

It is known from European publication EP 341 832 to form $NO_2$ in the exhaust gas from NO-containing exhaust gas by means of a platinum catalytic converter. This $NO_2$ makes it possible to burn soot at a temperature of less than 400° C. i.e. at the normal exhaust gas temperature. In this case, the problem exists that the diesel fuel has to have a very low sulphur content. Otherwise, the catalytic converter is poisoned and the soot in the filter can no longer be burnt as intended. However, sulphur-containing fuel is not available everywhere; this is a problem which, in particular, affects lorries used internationally.

It is known from U.S. Pat. No. 5,522,905 to add certain additives to the fuel of a diesel internal combustion engine. This reduces the ignition temperature of the soot in the filter to such an extent that combustion is possible at standard exhaust gas temperatures. These additives contain, inter alia, metal salts of an organic compound. In this context, the problem arises that the additives are expensive.

One object of the present invention is the object of providing a method and also a device which allow soot to be eliminated from a filter of a diesel internal combustion engine in an economically and ecologically appropriate way under a wide variety of conditions. In particular, the method and the device are also to be protected against incorrect intervention.

This object is achieved by passing NO-containing exhaust gas over a catalytic converter upstream of the filter in order to convert the NO in the exhaust gas into $NO_2$, and then using $NO_2$-containing exhaust gas to burn the particles which have been deposited on the filter when the sulphur content is lower than a predetermined sulphur content, the quantity of NO which has been converted into $NO_2$ being sufficient to enable the combustion of the particles to be carried out at a temperature of less than 400° C., and adding an additive which contains a metal salt of an organic compound to the fuel in order to reduce the ignition temperature of the particles which have been deposited on the filter to below the normal ignition temperature of the particles when the sulphur content is higher than the predetermined sulphur content. The object is also achieved by a device including an exhaust pipe having a filter and a catalytic converter, which is arranged upstream of the filter, for converting NO in the exhaust gas into $NO_2$, additive-adding means for adding additive to the fuel, and sulphur content-measuring means for determining a sulphur content in the fuel. Advantageous and preferred configurations of the invention form the subject-matter of further claims and are explained in more detail below. The content of the claims is made part of the content of the application by express reference.

A method according to the invention has two possible method steps, a) or b). In a first method step a), NO-containing exhaust gas is passed over a catalytic converter, for example an oxidation catalytic converter, upstream of the filter. NO in the exhaust gas is converted into $NO_2$, which is then used to burn .the particles which have been deposited on the filter. A quantity of $NO_2$ which is sufficient to carry out the combustion of the particles at a temperature of less than 400° C., in particular at standard exhaust gas temperature, is formed. For details in this connection, reference is expressly made to European publication EP 341 832, the content of which is hereby incorporated in the present description.

According to another method step b), adding an additive to the fuel is possible. This additive contains a metal salt of an organic compound, with the result that the ignition temperature of the particles which have been deposited on the filter is reduced to below the normal ignition temperature of the particles, in particular to the normal exhaust gas temperature.

Furthermore, according to the invention the sulphur content in the fuel is determined in order to carry out one method step or the other as a function of this measurement. If the sulphur content is lower than a predetermined sulphur content, method step a), i.e. the generation of $NO_2$, is carried out. On the other hand, if the sulphur content is higher than a predetermined sulphur content, method step b), i.e. the addition of additive, is carried out. Although in principle $NO_2$ may be generated as well, because the catalytic converter has generally been deactivated by the high sulphur content, scarcely any $NO_2$ is actually generated.

This has the advantage that the poisoning of the catalytic converter has no adverse effect on the deposits of soot on the filter, but rather the soot or particles is/are still burnt. If the sulphur content, i.e. the content of the substance which poisons or deactivates the catalytic converter, is measured in order to make this decision, it is possible to obtain a precise indication of the ability of the catalytic converter to function and the possibility of carrying out method step a).

Advantageously, in each case only one of the two method steps is carried out. In principle, method step a), i.e. the generation of $NO_2$, is particularly advantageously carried out. Method step b) is only carried out when the predetermined sulphur content has been exceeded.

It is possible and even, with a view to simplify the exhaust-gas management, advantageous for the exhaust-gas stream to be passed over the catalytic converter in accordance with method step a) even when method step b) is being carried out. However, since method step b) is only used if the sulphur content is too high, this sulphur content deactivates the catalytic converter and method step a) ceases to work.

There are various options for determining the sulphur content in the fuel. Firstly, it is possible to measure the exhaust gas back pressure upstream of the filter. If the sulphur content is too high, the catalytic converter is poisoned and its $NO_2$ formation function is reduced or eliminated. This leads to a rise in the exhaust gas back pressure, since the soot-burning operation effected by $NO_2$ is disrupted and the filter becomes clogged. For example, the fact that a certain exhaust gas back pressure has been exceeded can be deemed an indication of a predetermined sulphur content having been exceeded. The level of the sulphur content can be at least approximately determined from the extent to which the exhaust gas back pressure has been exceeded.

According to an alternative or additional option, it is possible to determine the sulphur content in the fuel, in particular in the fuel supply to the internal combustion engine. This can be achieved, for example, using a sulphur sensor. On the one hand, this may take place in a tank which holds the fuel. On the other hand, a determination of this type may also be performed in a fuel feed line to the internal combustion engine itself. A measurement of this type advantageously takes place independently of fuel mixing during a plurality of different refueling stops.

It is possible for the sulphur content to be determined in each case at predetermined time intervals. This makes it possible to reduce costs. The sulphur content should be predetermined at least each time the vehicle is refuelled. The sulphur content in the predetermined fuel can only change as a result of the type of refuelling. In this context, it conceivable to detect a refuelling operation by means of a suitable sensor on a tank cover, on the level-measuring means or the like and to trigger a measurement of the sulphur content.

Alternatively, it is possible to determine the sulphur content in the fuel on an ongoing basis. This allows accurate determination of the actual state. Determination of this type may take place in a fuel tank or a fuel feed line.

According to one possible embodiment of the invention, the addition of additive in accordance with method step b) may be metered. The metering preferably takes place as a function of the predetermined sulphur content being exceeded. This makes it possible to avoid either too little or too much additive being used.

Once again, as with the measurements of the sulphur content, there are a number of possible options with regard to the addition of the additive. In principle, it is possible for additive to be added to the fuel all in one go into the tank each time the vehicle is refuelled. The quantity required for this purpose can be determined from the sulphur content and the tank volume or refuelling delivery.

According to a further possibility, the additive may also be added to the fuel discontinuously, i.e. a number of times each time the vehicle is refuelled. By way of example, this allows discontinuous combustion, at intervals, of particles which have been deposited on the filter. In this way, additive is not added permanently.

Finally, it is also possible for the additive to be added to the fuel substantially continuously. This advantageously takes place into a fuel line to the internal combustion engine. In this case, it is possible in each case to measure the sulphur content on an ongoing basis and to meter the additive accordingly.

In addition to a metal salt of an organic compound, the additive may also include an alkaline metal salt from the group of the rare earths. It is particularly advantageous for these two metal compounds to be the only metal compounds in the additive. For further details, in particular possible compositions of the additive, reference is made to U.S. Pat. No. 5,522,905 referred to above, the content of which is hereby incorporated in the description.

The device according to the invention is distinguished by the fact that it has an exhaust pipe with a filter and a catalytic converter arranged upstream of the filter. The catalytic converter is designed to generate $NO_2$ from NO in the exhaust gas. There are additive-adding means for adding an additive to the fuel. Furthermore, there are sulphur content-measuring means for determining the sulphur content in the fuel. This device can particularly advantageously be used to carry out the method described above. The increased outlay compared to conventional devices remains within acceptable limits.

The catalytic converter provided may be a platinum catalytic converter, in particular with a honeycomb monolith. The additive-adding means may be connected to a tank or advantageously to a fuel supply or a fuel line to the internal combustion engine. They may include a stock of additive, for example in a storage container. Furthermore, there is a valve facility, by means of which the metering is effected. With regard to the structure, reference is made to European publication EP 341 832 mentioned above.

The sulphur content-measuring means may firstly have a pressure-measuring facility, for example gas pressure sensors. These may be arranged in the exhaust system upstream of the filter and record the rise in the exhaust gas back pressure above a defined, predetermined level.

As an alternative or in addition, the sulphur content-measuring means may have a sulphur sensor. The latter should be arranged in the fuel supply upstream of the internal combustion engine, either in a fuel line or in a fuel tank.

Furthermore, there is advantageously a control unit which causes additive to be added as a function of the state which has been determined by the sulphur content-measuring means or the sulphur content.

If the transmission from method step a) as the method step which is used in principle to method step b) in an exceptional situation takes place substantially automatically, combustion of the particles in the filter is ensured at any time. This is true both in situations in which no sulphur-containing fuel is available and in situations in which refuelling has been carried out with fuel with a sulphur content which is too high, either by mistake or because of the absence of accurate knowledge. Therefore, the way in which the combustion of the particles takes place is not dependent on an operator.

BRIEF DESCRIPTION OF THE DRAWING FIGURE

The drawing FIGURE shows a diagrammatic illustration of the structure of an exhaust device according to the invention in a diesel internal combustion engine.

DETAILED DESCRIPTION OF THE INVENTION

A possible structure of an exhaust device and possible method sequences in accordance with one or more aspects of the invention are to be explained with reference to the highly diagrammatic illustration presented in the FIGURE. At this point, to improve the understanding of the invention, reference is expressly made to the documents which have been mentioned above.

The device 11 includes an internal combustion engine, in the form of a diesel engine 13, and on the one hand a fuel feed 14 and on the other hand an exhaust-gas discharge 15.

The fuel feed 14 comprises a tank 17 and a fuel line 18, which leads to the diesel engine 13. Sulphur sensors 19 together with a sulphur-measuring unit 20 are illustrated. As illustrated in dashed lines, a sulphur sensor 19 may be arranged either in the tank 17 or in the fuel line 18. This substantially depends on whether the sulphur content of the fuel which is fed to the diesel engine 13 is to be measured continuously (in which case in the fuel line 18) or discontinuously (in which case in the tank 17).

Furthermore, the FIGURE illustrates an additive storage container 22 which contains the additive to be added to the fuel. Two possibilities for additive feeds 23 are illustrated, likewise in dashed lines. These may lead on the one hand to the tank 17, in order to mix a relatively large quantity of additive with the fuel which is present therein, or on the other hand into the fuel line 18. This option should be selected if additive is to be added continuously or at a plurality of intervals.

The exhaust-gas discharge 15 substantially comprises an exhaust pipe 25 which leads away from the diesel engine 13. As a further possible option for determining the sulphur content in the fuel, downstream of the diesel engine 13 it includes an exhaust-gas pressure sensor 26 and an associated exhaust-gas pressure-measuring facility 27. The exhaust-gas pressure sensor 26 is used to determine the exhaust gas back pressure upstream of the filter 31. An excessively high sulphur content of the fuel is indirectly determined therefrom, as described in detail above.

A particle filter 31 is arranged downstream of the catalytic converter 29, which is designed to convert NO in the exhaust gas into $NO_2$. This particle filter is used to filter soot particles out of the exhaust gas. By means of the method according to the invention and the device according to the invention, this particle filter 31 can have the deposited soot removed by combustion either at defined time intervals or substantially continuously. Downstream of the particle filter 31, the exhaust pipe 25 leads onward to known exhaust facilities or the like.

As has already been explained above, the drawing first of all shows three different ways or installation points for determining the sulphur content of the fuel. Direct measurement of the sulphur content in the fuel may take place in the tank 17 or in the fuel line 18 upstream of the diesel engine 13. Since the tank 17 is generally refuelled at intervals, generally just before it is completely empty, it is possible to use a refuelling operation to determine the intervals. This can be detected by sensors, either on the tank cap or on a level-measuring facility.

If, by way of example, fuel with a high sulphur content is added to fuel with a low sulphur content, a mixture with an overall sulphur content is formed. This may be too high for the catalytic converter to function perfectly. It can be assumed that the mixing takes place to some extent homogeneously, and therefore a sulphur sensor 19 in the tank 17 is also able to provide information about the actual sulphur content.

On the other hand, if a sulphur sensor 19 is arranged in the fuel line 18 itself, measurement which is continuous or provided at short time intervals can and should be carried out, in order in each case to determine what type of fuel or a fuel with what sulphur content is fed to the diesel engine 13. As a function of this, it is in each case possible to provide for measures such as the addition and metering of additive from the additive storage container 22.

On the other hand, measurement of the exhaust gas pressure in the exhaust pipe 25 upstream of the filter 31 by means of the exhaust-gas pressure sensor 26 is an indirect method for measuring the sulphur content of the fuel. In this case, the disruptive effect of a sulphur content which is too high, namely the poisoning of the catalytic converter 29 and therefore the increase in the exhaust gas back pressure which is caused by this poisoning, is measured directly. This may in certain circumstances be advantageous compared to measurement of the sulphur content directly in the fuel. It is possible to choose between direct sulphur content measurement and an indirect method such as the determination using the exhaust gas back pressure depending on which sensors are less expensive, more robust or advantageous in some other way.

The addition of additive from the additive storage container 22 by means of the additive feed 23 may, in a similar way to the sulphur sensor 19, be provided to take place either into the tank 17 directly or into the fuel line 18. Addition of additive into the tank 17 should take place substantially at the intervals which correspond to the refuelling operations. In this way, it is possible to achieve mixing of fuel with a defined sulphur content and the corresponding addition of additive.

On the other hand, addition of additive directly into the fuel line should take place substantially continuously or at short time intervals. This addition may in each case be matched immediately or on an ongoing basis to the current sulphur content of the fuel.

Finally, it is also possible, in addition to the inventive measures which have been described so far, to increase the exhaust-gas temperature by means of engine-internal measures. In this way too it is possible to achieve combustion of soot in the particle filter 31. However, in this case the ignition temperature of the soot is not reduced so that it can be reached at the standard exhaust gas temperatures in order to burn soot. In this case, the exhaust gas temperature itself is increased, in order to reach the standard ignition temperature of soot. Such engine-internal measures may include influencing the generation of exhaust gas or metering the fuel into the diesel engine 13. Such engine-internal measures can be initiated in situations in which the other methods, such as $NO_2$ generation or addition of additive, are not sufficient to burn soot off the particle filter 31 fully. This can be determined, for example, by pressure sensors or the like upstream of the particle filter 31. These can provide a warning if the particle filter 31 is excessively clogged with soot and has therefore become almost completely blocked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for removing particles, which have been deposited on a filter arranged in an exhaust system of an internal combustion engine which is operated with fuel, by combustion, comprising:

determining a sulphur content in the fuel, passing NO-containing exhaust gas over a catalytic converter upstream of the filter in order to convert the NO in the exhaust gas into $NO_2$, and then using $NO_2$-containing exhaust gas to burn the particles which have been deposited on the filter when the sulphur content is lower than a predetermined sulphur content, the quantity of NO which has been converted into $NO_2$ being sufficient to enable the combustion of the particles to be carried out at a temperature of less than 400° C., and adding an additive which contains a metal salt of an organic compound to the fuel in order to reduce the ignition temperature of the particles which have been deposited on the filter to below the normal ignition temperature of the particles when the sulphur content is higher than the predetermined sulphur content.

2. The method according to claim 1, wherein adding said additive is only carried out instead of or in addition to passing the NO-containing exhaust gas and using the $NO_2$ containing exhaust gas if the predetermined sulphur content is exceeded.

3. The method according to claim 1, wherein determining the sulphur content in the fuel is done by measuring the exhaust gas back pressure upstream of the filter and, if a certain exhaust gas back pressure is exceeded, deeming that a predetermined sulphur content has been exceeded.

4. The method according to claim 1, wherein the sulphur content in the fuel supply to the internal combustion engine is determined by determining the sulphur content in a tank which holds the fuel.

5. The method according to claim 1, wherein the sulphur content is determined at least at defined time intervals.

6. The method according to claim 1, wherein the sulphur content in the fuel is determined substantially continuously.

7. The method according to claim 1, wherein the additive is added in metered form.

8. The method according to claim 1, wherein the additive is added to the fuel all in one go into the tank each time the vehicle is refuelled.

9. The method according to claim 1, wherein the additive is added discontinuously to the fuel to provide for discontinuous combustion of particles which have been deposited on the filter.

10. The method according to claim 1, wherein the additive is added substantially continuously to the fuel, into the supply to the internal combustion engine.

11. The method according to claim 1, wherein the catalytic converter includes a metal from the platinum group.

12. The method according to claim 1, wherein the additive includes an alkaline metal salt from the group of the rare earths in addition to the metal salt of the organic compound.

13. The method according to claim 5, wherein the sulphur content is determined at least each time refuelling occurs.

14. The method according to claim 7, wherein the additive is added as a function of the predetermined sulphur content.

15. The method according to claim 10, wherein the additive is added into a fuel line from a fuel tank to the internal combustion engine.

16. An exhaust device of an internal combustion engine for fuel, comprising:
an exhaust pipe having a filter and a catalytic converter, which is arranged upstream of the filter, for converting NO in the exhaust gas into $NO_2$,
additive-adding means for adding additive to the fuel, and
sulphur content-measuring means for determining a sulphur content in the fuel.

17. The device according to claim 16, wherein the catalytic converter includes a metal from the platinum group on a honeycomb monolith.

18. The device according to claim 16, wherein the additive-adding means are connected to a fuel supply to the internal combustion engine.

19. The device according to claim 16, wherein the additive-adding means are connected to a storage tank for the fuel.

20. The device according to claim 16, wherein the additive-adding means have a stock of additive, defined by a storage container, which is provided with a valve device.

21. The device according to claim 16, wherein the sulphur content-measuring means have a pressure-measuring facility which is arranged in the exhaust system upstream of the filter.

22. The device according to claim 16, wherein the sulphur content-measuring means have a sulphur sensor which is arranged in the fuel supply upstream of the internal combustion engine.

23. The device according to claim 21, wherein the pressure-measuring facility includes gas-pressure sensors.

24. The device according to claim 22, wherein the sulphur sensor is arranged in a fuel tank.

* * * * *